United States Patent [19]

Haderle et al.

[11] Patent Number: 5,561,798
[45] Date of Patent: Oct. 1, 1996

[54] COMPUTER PROGRAM PRODUCT AND PROGRAM STORAGE DEVICE FOR IMPROVING DATA RECOVERY PERFORMANCE

[75] Inventors: Donald J. Haderle, Los Gatos; James Z. Teng, San Jose, both of Calif.

[73] Assignee: International Business Machines Corporation, Armonk, N.Y.

[21] Appl. No.: 481,133

[22] Filed: Jun. 7, 1995

Related U.S. Application Data

[62] Division of Ser. No. 31,791, Mar. 15, 1993.

[51] Int. Cl.$^6$ .................................................. G06F 17/30
[52] U.S. Cl. ................. 395/600; 364/282.1; 364/285; 364/DIG. 1
[58] Field of Search .................................. 395/600, 575, 395/650; 364/DIG. 1, DIG. 2

[56] References Cited

U.S. PATENT DOCUMENTS

| | | | |
|---|---|---|---|
| 5,155,850 | 10/1992 | Janis et al. | 395/600 |
| 5,276,872 | 1/1994 | Lomet et al. | 395/600 |
| 5,278,982 | 1/1994 | Daniels et al. | 395/600 |
| 5,280,610 | 1/1994 | Lorie et al. | 395/600 |
| 5,280,611 | 1/1994 | Mohan et al. | 395/600 |
| 5,287,501 | 2/1994 | Lomet | 395/600 |
| 5,329,628 | 7/1994 | Yamamoto et al. | 395/425 |
| 5,333,303 | 7/1994 | Mohan | 395/575 |
| 5,333,314 | 7/1994 | Masai et al. | 395/600 |
| 5,335,343 | 8/1994 | Lampson et al. | 395/575 |
| 5,363,505 | 11/1994 | Maslak et al. | 395/650 |
| 5,369,757 | 11/1994 | Spiro et al. | 395/575 |

OTHER PUBLICATIONS

Crus, "Data Recovery in IBM Database 2", *IBM Systems Journal*, vol. 23, No. 2, 1984, pp. 178–188.
Harderle et al., "Apply Slow Close Process to Minimize Physical Open/Close Activities for Database Datasets", *IBM Technical Disclosure Bulletin*, vol. 32, No. 10B, Mar. 1990, pp. 405–407.

*Primary Examiner*—Thomas G. Black
*Assistant Examiner*—Maria N. Von Buhr
*Attorney, Agent, or Firm*—David J. Kappos, Esq.; Sterne, Kessler, Goldstein & Fox P.L.L.C.

[57] ABSTRACT

A system and method are provided for recovering a computerized database. During transaction processing of a database, at least one log range is tracked comprising update transaction log records. The log range has a begin value and an end value. The begin value corresponds to a log RBA location of a first access of the database by an updating transaction. The end value corresponds to a log RBA location at a commit or abort of a last updating transaction. The end value corresponds to a point when the database is designated as being read only (called pseudo open). During recovery of the database, the update transaction log records in the log range are applied to a version of the database stored in non-volatile memory.

8 Claims, 5 Drawing Sheets

COMPUTER PROGRAM PRODUCT AND PROGRAM STORAGE DEVICE FOR IMPROVING DATA RECOVERY PERFORMANCE

This application is a divisional of application no. 08/031,791, filed Mar. 15, 1993, (status: pending).

FIELD OF THE INVENTION

This invention relates to database management systems for storing, organizing and retrieving data. More particularly, this invention relates to a system and method for improving the time required to recover a database following a system failure.

BACKGROUND OF THE INVENTION

In a computerized database system, data is stored electronically in non-volatile storage devices such as direct access storage devices (DASDs) also referred to as disks. The DASD is associated with a data processing system comprising a central processing unit (CPU) and volatile random access memory (RAM). Database management system (DBMS) software programs are executed by the CPU to logically organize and control access to the data stored in the storage device. The data is accessed using application programs or query languages such as the structured query language (SQL).

A unit of recovery refers to an application or transaction that updates data. Updating transactions replace data in the database with a new value., delete data from the database and add mew data to the database.

A single transaction typically accesses multiple pieces of data for reading and for updating. Transactions that retrieve data based on the satisfaction of query criteria read multiple pieces of data during the process of identifying data that satisfies the query. Transactions will also frequently update multiple pieces of data during a transaction. For example, a transaction may update information for all employees in a department which effects multiple pieces of data.

The progress of a transaction is tracked until the transaction is "committed". A transaction is committed when all data accessed and modified by the transaction is in a consistent state. All updates made by a transaction are either completed (committed) or aborted.

The data is stored in pages (or other forms of organization) on DASD. When a particular piece or row of data is accessed (for reading or updating), the corresponding page is read into a buffer in the system's faster volatile random access memory. The buffers are stored in a pool in memory. Periodically the changed data pages in the buffer pool are read back into the non-volatile storage.

Application programs and SQL queries typically update many pieces of data on many different pages during a single transaction requiring many different pages to be read into a buffer pool. The pages are read back and forth between the buffer pool and the DASD in order to provide room for all of the pages needed to be updated. Therefore, pages with updated information from uncommitted transactions are written to the DASD while reclaiming buffer pool space.

When a DBMS terminates abnormally prior to completing all work, the transactions that were processing during the failure and only partially executed may have caused the data to be in an inconsistent state. Therefore, during recovery processing, the data in the system may need to be restored to a consistent state.

System failures are caused by hardware problems, software problems and power outages. For enterprises that rely on computerized database systems, a system that has had a software or hardware failure needs to be restored and returned to a consistent state as quickly as possible.

There are two types of data errors that can occur, logical and physical errors. Logical errors concern updates that were not properly recorded and are caused by system failures or errors in the applications programs. Physical errors are caused by hardware or media malfunctions such as disk reading or writing errors.

As is well known by those skilled in the art, a DBMS uses a linear sequential log to record all modifications made to the data. The recovery process involves applying the log records to the version of the database stored on the DASD.

Each log record has associated with it a relative byte address (RBA) which is the offset of the log record from the beginning of the log. The RBA never repeats and represents a point in time when a modification was recorded.

The log records provide delimiters for identifying updates affecting the data object. The log records for a data object do not correspond to a single transaction since multiple transactions can be accessing the same data. The log is always written to DASD prior to the page being written to the DASD.

Each system, when updating data, assigns a log sequence number for the page. The log sequence number is the RBA of the log record in the log file for the update. In the event of system failure, the page is read from the disk. The transactions that have occurred after the page was written to disk are identified based on the log sequence number. The page's state is brought up to date by applying the log records whose RBA is greater than the log sequence number associated with the page.

At periodic intervals, a DBMS performs a "checkpoint" operation. The system status information, including information regarding active transactions, is recorded on the log. Following a system failure, the system is restarted from the last checkpoint. The database checkpoint log records are normally written only for those databases open for update transactions.

The frequency of checkpoints is determined by the amount of information written in the log. The frequency of checkpoints has an effect on the amount of time required to perform restart and recovery operations since checkpoints reduce the quantity of log records that must be processed. However, there are time and system constraints when performing checkpoints. Therefore, there is a need to minimize the overhead associated with performing checkpoints.

Two types of image copies of the database are maintained for recovery purposes, full image copies and incremental image copies. Full image copies are copies of the database objects. Incremental copies are copies of pages that have been updated since the full image copy was made. The RBA of the log at the time the full image copy was made is the starting point for applying log records pertaining to the data object.

In the prior art, as disclosed by Crus, R. A., "Data Recovery in IBM Database 2", IBM System Journal, Vol. 23, No. 2, 1984, in order to minimize the amount of log records that must be saved during the media recovery process, the DBMS tracks the log RBA of the first update to the data object and when the database is closed. The information is stored in a directory of stop and start RBA values. During-media recovery, the start/stop RBAs associated with the object being recovered are read from the directory and only the log records within the RBA range defined by the stop/start directory is processed.

In a preferred embodiment, the log range information is stored in a system database (called SYSLGRNG) and used during a database recovery operation to determine areas in the log that need to be processed.

The log range is started for a database when switched from Read Only ("R/O") to Read Write ("R/W") state on the first update operation. Read Only signifies that the transactions accessing the database are only reading the data in the database and are not updating the database. "Read Write" signifies that the transactions accessing the database are both reading the database and writing updates to the database.

More specifically, a begin log range value is set to the current end of the log's RBA before the first update log record is written. At the time that a log range entry is created, an end log range value is set to "0" which indicates that the ending log range is unknown. In the prior art, the end log range value is updated when the database lock is released by all referenced transactions (including R/O transactions) or until the DBMS is terminated.

The DBMS uses locks to control concurrent access to data by different transactions. Usually, the database lock is released at transaction commit. For DBMSs that support hierarchical locking, the database lock is always acquired by a transaction before it can access/update the database. The database lock mode denotes whether or not "page" locks (a narrower scope lock) will be acquired while accessing data within the database.

For performance reasons, a database, once opened (updated), is not closed when it is no longer in use (i.e., no locks held on the database). In D. J. Haderle, J. Z. Teng, and A. Y. Yang, "Apply Slow Close Process to Minimize Physical Open/Close activities for Database Datasets", IBM Technical Disclosure Bulletin, March 1990, pages 405–407, a deferred close mechanism is disclosed that improves DBMS performance by minimizing database open/close activities. In such a system, the database remains open until all transactions that are accessing the database, even to only read the database, are completed. This results in a long log range for recovering the database.

The scheme of maintaining the SYSLGRNG entries as proposed in the prior art has a number of disadvantages. For databases that have frequent read access with occasional update activities, the SYSLGRNG entries will not be closed until the last read only transaction is committed and the end log range value is set to the current log RBA value. There can be a lot of log records in the log range between the last written log for this database and the current end of log RBA value if there were heavy update activities by other concurrent transactions.

For transactions that are performance sensitive, the database locks are normally not released until the transactions are terminated. By associating the close of the SYSLGRNG entries with the status of the database locks, this potentially defeats the purpose of maintaining the SYSLGRNG entries.

For databases that become in use and not in use frequently, the SYSLGRNG database will grow more rapidly if the status of the database locks is used to determine when to close the SYSLGRNG entries. Frequent create/update of the SYSLGRNG entries will have adverse effects on the system performance as well as degrading transaction response time.

In a multi-database system, multiple systems share the same data stored in databases. When multiple transactions access data in the same database there is even more of a danger that the data will become inconsistent. When a transaction is updating data in a database and another transaction tries to read that same data, there is a need to ensure the consistency of data for the transactions. Locking mechanisms are used to limit access to database.

DBMSs that support dynamic recognition of an environment where databases can be updated by more than one system (a multi-system data sharing environment) have a lot of overhead from maintaining consistent data. There are advantages in marking a system as read only (R/O) so that the data can be shared with less overhead.

One or more of the foregoing problems are overcome by the present invention.

SUMMARY OF THE INVENTION

The processes of switching a database from R/O to R/W and R/W to R/O state are also referred to as pseudo open and pseudo close, respectively. Also, the "database" referenced in this invention is a generic term which can be applied to a file or a data set in a direct access storage device (DASD).

A system and method are provided for recovering a computerized database. During transaction processing of a database, at least one log range is tracked comprising update transaction log records. The log range has a begin value and an end value. The begin value corresponds to a log RBA location of a first access of the database by an updating transaction. The end value corresponds to a log RBA location at a commit or abort of a last updating transaction. During recovery of the database, the update transaction log records in the log range are applied to a version of the database stored in non-volatile memory.

In a preferred embodiment of the invention, each database is initially designated as a pseudo close database. The accessing of a database by an updating transaction is tracked. A pseudo close database accessed by an updating transaction is designated as a pseudo open database and a corresponding RBA location is recorded as a log range begin value. A counter of uncommitted transactions updating a pseudo open database is maintained. The counter is incremented when an updating transaction accesses the pseudo open database and decremented when the updating transaction is committed or aborted, wherein when the counter has a value of zero, there are no updating transactions accessing the database. A pseudo open database not accessed by an updating transaction for a predetermined period is designated as a pseudo close database and a corresponding RBA location is recorded as a log range end value.

One feature of this invention is a system and method which are used by computerized database management systems (DBMSs) to improve data recovery performance for databases stored in one or more DASDs.

Another feature of this invention is a system and method for DBMSs to dynamically switch a database access mode from Read Write (R/W) to Read Only (R/O) state when the database update activities are ceased for a period. Switching infrequently updated databases to a R/O state results in a number of performance benefits, including decreasing the DBMS system checkpoint time.

Another advantage of the invention is for a multi-system data sharing environment where the global locking overhead is reduced when databases are no longer in inter-system write/write sharing state.

For DBMSs that support dynamic recognition of an environment where databases can be updated by more than one system (a multi-system data sharing environment), detecting and converting infrequently updated shared databases to read only (R/O) mode, allows the DBMS to convert databases in an environment where each database can be updated by any other system in a shared database mode to non-shared mode or R/O sharing or an environment where one system has R/W interest, and one or more other sharing systems have R/O interest. This will minimize system overheads to manage shared databases that are no longer in full R/W sharing mode.

DETAILED DESCRIPTION OF THE INVENTION

Figure 1:
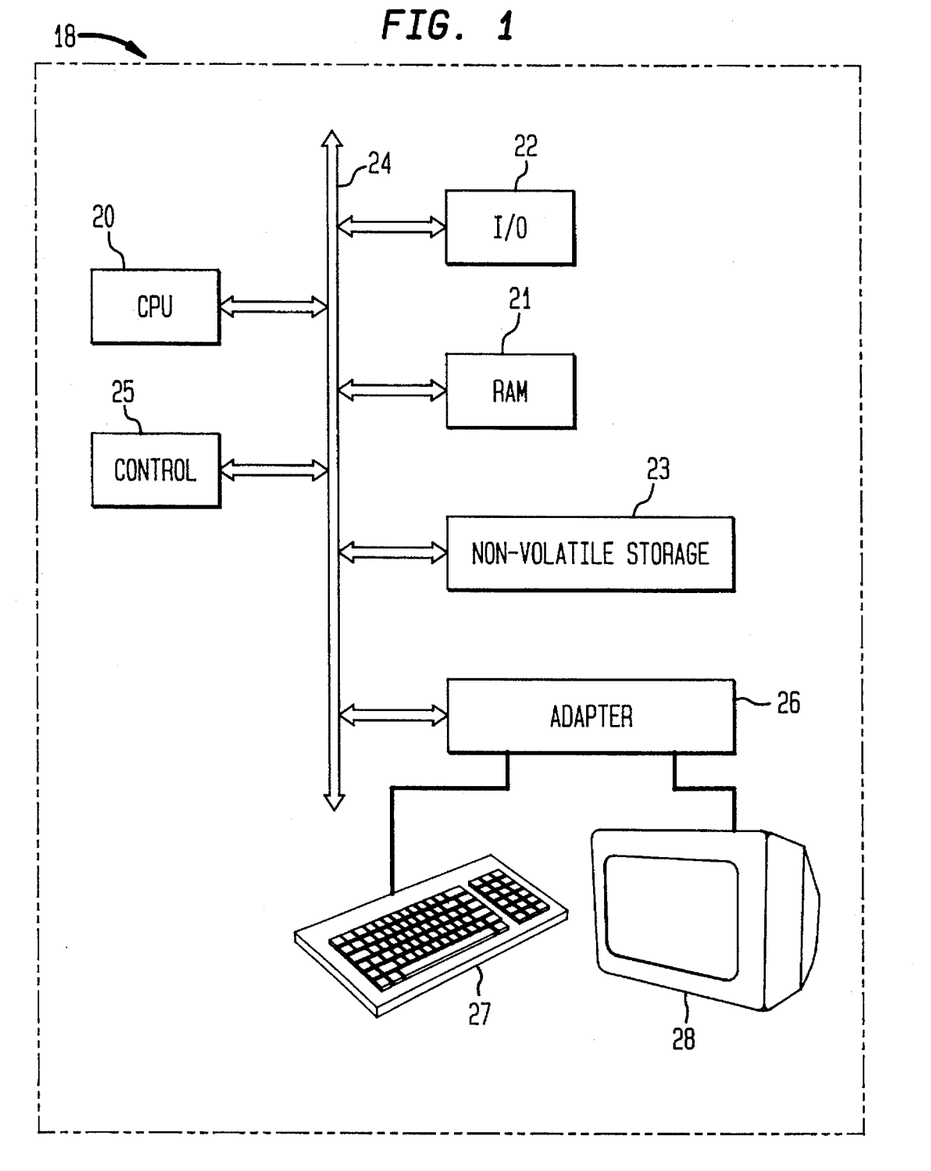
FIG. 1 is a schematic diagram of a computer system used in implementing the invention.

The database recovery method is implemented in connection with the data processing apparatus 18 shown in FIG. 1. The apparatus comprises a central processing unit (CPU) 20, random access memory 21, input/output port 22, and non-volatile storage 23 such as disk storage or read only memory (ROM), all connected to a common bus structure 24. Control circuitry 25 performs housekeeping operations, such as providing appropriate clock signals and controlling the operation of the bus. An adaptor 26 is used to interface to other components such as a keyboard 27 and a visual display unit 28. The general purpose data processor shown in FIG. 1 is used to perform the invention under program control.

The present invention enables a DBMS to efficiently maintain a table of log ranges called a SYSLGRNG table for use during database recovery. Instead of using, as in the prior art, a database lock as a criteria for determining when the SYSLGRNG entry can be closed, the DBMS maintains a write-claim counter for each open database to keep track of the number of transactions that have outstanding update intent (i.e., uncommitted updates) against the database.

Each transaction registers its update intent (i.e., increments the database's write-claim counter by one) prior to making any updates to the database and de-registers its update intent (i.e., decrement the database's write-claim counter by one) at transaction commit or abort. For ease of reference, the process of registering and de-registering the update intent to a database is called "claim" and "declaim". Once a write claim is made to a database, the transaction will always need to declaim at commit (i.e., regardless of whether it keeps or releases the database lock at commit).

When an updated database's write-claim counter becomes zero, it indicates that the database update activities are ceased and the database can become a candidate for pseudo close (i.e., close the SYSLGRNG entry and switch the database to R/O state). In order to minimize the system overhead of performing frequent pseudo close and pseudo open operations, the DBMS selects a candidate database for pseudo close when its update activities are ceased for a predetermined period. It is desirable for the DBMS to close the open-ended SYSLGRNG entry to prevent an unnecessarily long log scan at database recovery.

In one form of the invention, the predetermined period is based on the number of consecutive DBMS system checkpoints. A DBMS checkpoint is typically triggered by an amount of logging activities within a database. When there is no logging activities for a database within "n" number of consecutive checkpoints, the SYSLGRNG entry is closed. Preferably, the number "n" is set at each database level with a DBMS system default. For databases with high availability requirement, the number "n" is set to a lower value to allow a faster database recovery. However, for ease of implementation, it can be defined at the system level (i.e., the same "n" value applied to all databases within the DBMS).

In another form of the invention, the predetermined period is based on an amount of time. This is a preferred criteria for detecting infrequently updated databases in a DBMS that has low update activities. This is a particularly useful criteria for DBMSs that support dynamic recognition of inter-system R/W database sharing in a Multi-system Data Sharing environment.

To further improve the accuracy of the log range information, the DBMS saves the log RBA value at the time that the last updating transaction is committed. The saved log RBA value is used as the end log range value when the SYSLGRNG entry is closed at the time that the database is selected for pseudo close.

Figure 2:
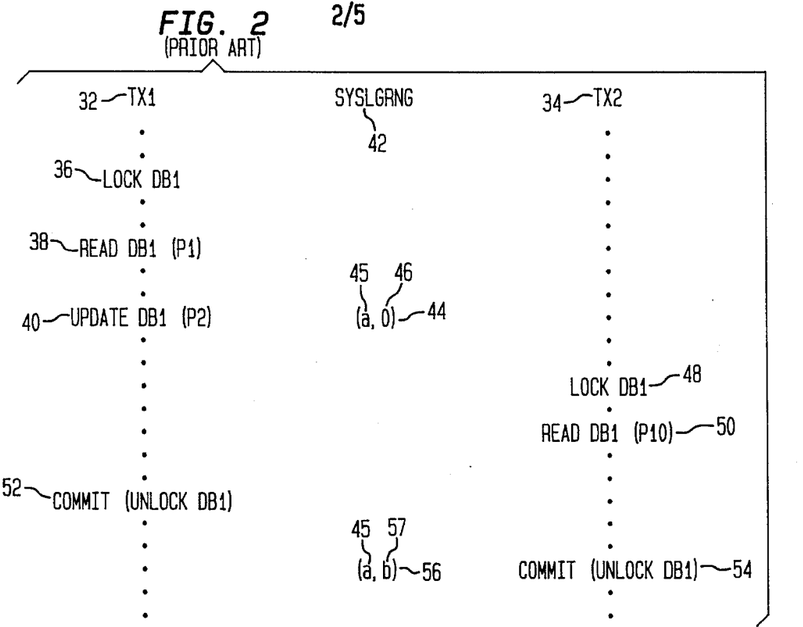
FIG. 2 is a table of transactions and corresponding SYSLGRNG entries according to the prior art.
Figure 3:
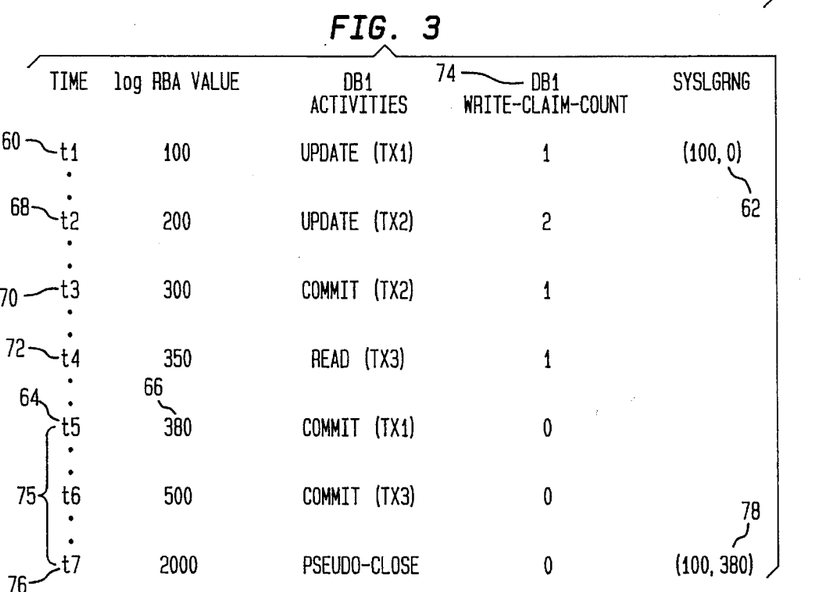
FIG. 3 is a table of transactions and corresponding SYSLGRNG entries according to the present invention.

The invention can be further described with reference to FIGS. 2 and 3. FIG. 2 shows a chart of transactions and corresponding SYSLGRNG under the prior art procedure for processing. FIG. 3 shows an example of transactions and corresponding SYSLGRNG entries using the present invention.

Referring to FIG. 2, a database DB1 has not been accessed by an updating transaction prior to being accessed by transactions TX1 32. In the example, DB1 is also accessed by a read-only transaction TX2 34. Both TX1 and TX2 have the attribute of releasing the database lock at commit. For performance consideration, transactions will keep the database locks across commits (i.e., database locks are not released until all transactions are terminated).

Transaction TX1 acquires a lock on DB1 36 and rends page P1 of DB1 38. Since the DB1 has not been updating there is still no SYSLGRNG entry for the database. Transaction TX1 then updates page P2 of DB1 40. At the time of the update to DB1 a SYSLGRNG entry is created in the SYSLGRNG table for the database 42. The initial entry for DB1 is (a,0) 44, where "a" 45 is the current end of log RBA before an update log record is written by TX1. The "0" entry 46 is used as a place holder to indicate that the log must be processed from RBA location "a" to the end of the log at the time of recovery processing, if the "0" entry has not been replaced.

In the time sequence shown in FIG. 2, after TX1 updates DB1, the transaction TX2 acquires a lock on DB1 48 and reads page P10 of DB1 50. Thereafter, transaction TX1 commits 52, but, TX2 still has a lock (for reading) on DB1, so DB1 is not closed. When TX2 commits 54, the SYSLGRNG entry is updated to the value (a,b) 56, where "b" 57 is the current end of log RBA when commit is issued by TX2. DB1 becomes not in use after TX2 is committed (i.e., no locks held on DB1).

Since there can be numerous other concurrent update transactions updating other databases between these transactions TX1 and TX2 commit points, the log RBA value "b" could be significantly higher than the value "a".

The scheme of maintaining the SYSLGRNG entries in the prior art has a number of disadvantages. For databases that have frequent read access with occasional update activities, the SYSLGRNG entries will not be closed until the last read only transaction is committed. The end log range value is set to the current log RBA value when the the last read only transaction is committed. There can be a larger log range between the last written log for this database and the current end of log RBA value if there were heavy update activities to other databases by other concurrent transactions. Furthermore, for transactions that are performance sensitive, the database locks are normally not released until the transactions are terminated. By associating the close of the SYSLGRNG entries with the status of the database locks, this could potentially defeat the purpose of maintaining the SYSLGRNG entries. Additionally, for databases that become in use and not in use frequently, the SYSLGRNG database will grow more rapidly if the status of the database locks is used to determine when to close the SYSLGRNG entries. Frequent create/update SYSLGRNG entries will have adverse effects on the system performance as well as degrading transaction response time.

FIG. 3 provides a time flow diagram of transactions updating a database and corresponding SYSLGRNG entries using the present invention. Referring to FIG. 3, for database "DB1", TX1 and TX2 are updating transactions while TX3 only performs read only operations against the database.

The transaction TX1 updates the (previously unupdated) database DB1 at time t1 60. At that time, a SYSLGRNG entry is created (100,0) 62. As in the prior art example, the "100" entry corresponds to the log RBA value at the time of the update and the "0" corresponds to the end of the log at the time of the recovery. The transaction TX1 commits at time t5 64 when the log RBA has a value of "380" 66.

Before TX1 committed, another transaction TX2 updated DB1 68 and committed 70. The third transaction TX3 read DB1 72 but had not committed. Transaction TX3 committed when the log RBA value was 500.

A write-claim counter 74 for DB1 tracks the number of transactions updating the database DB1. The counter was incremented by transactions TX1 and TX2 updating the database DB1 and decremented when the updating transactions TX1 and TX2 committed. The write-claim counter was not effected by the read only transaction TX3 reading data or committing (neither incremented or decremented). After the transaction TX1 committed 64 there were no longer any updating transactions accessing the database DB1.

The log RBA value when the write-claim counter became zero (380) is stored. After a predetermined period of not being accessed by any updating transactions 75, the database DB1 is designated as pseudo close 76. The SYSLGRNG entry for the database DB1 is changed to (100, 380) 78 where 380 is the log RBA value at the time the write-claim counter became zero.

Figure 4:
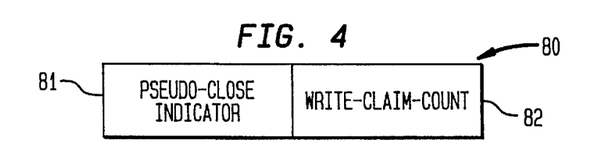
FIG. 4 is a schematic diagram of a data structure for controlling a pseudo open and a pseudo close of a database.

The predetermined period is based on elapsed time or on the number of system checkpoints. The DBMS maintains control information to serialize claim/declaim and pseudo close/pseudo open processes. Referring to FIG. 4, the database maintains two indicators 80, a pseudo close indicator 81 and a write-claim counter 82. The pseudo close indicator and the write-claim counter are stored in the same 4-byte word within the DBMS memory structure that represents an open database.

The write-claim counter 82 indicates how many transactions are currently updating the database. When a database is designated pseudo close, the write-claim counter must be equal to zero. The pseudo close indicator 81 is used for determining whether the database is in the process of being set to pseudo close. When the indicator is ON, pseudo close is in progress.

Figure 5:
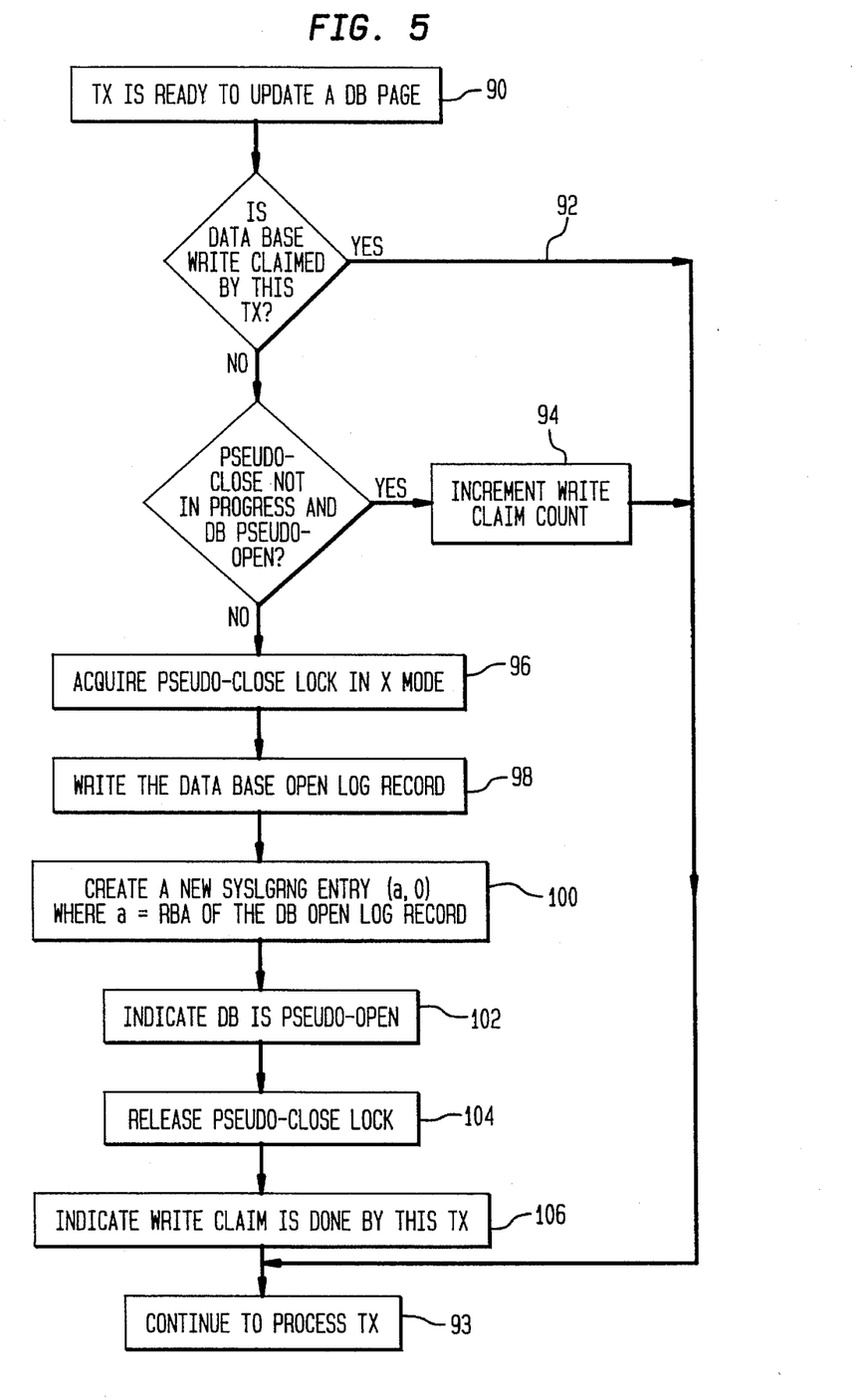
FIG. 5 is a flow chart of a process for designating a database as pseudo open.
Figure 6:
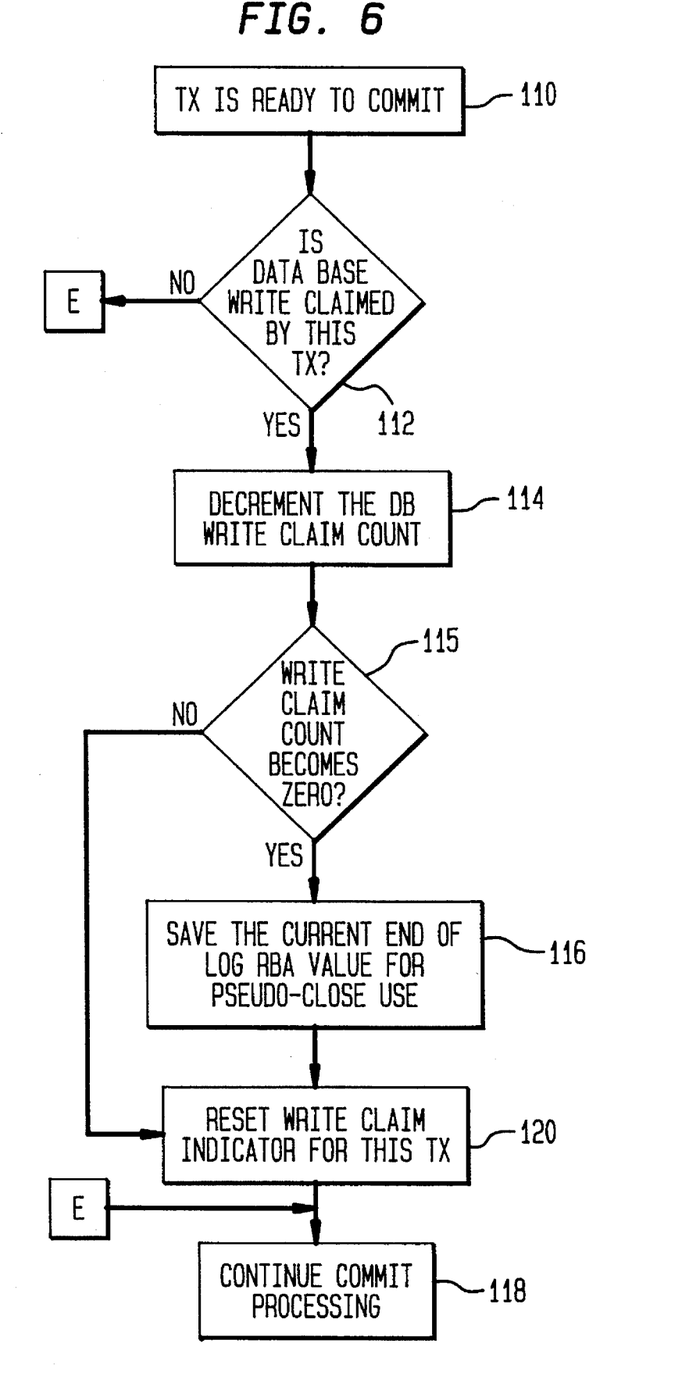
FIG. 6 is a flow chart of a process for committing a transaction when implementing the present invention.
Figure 7:
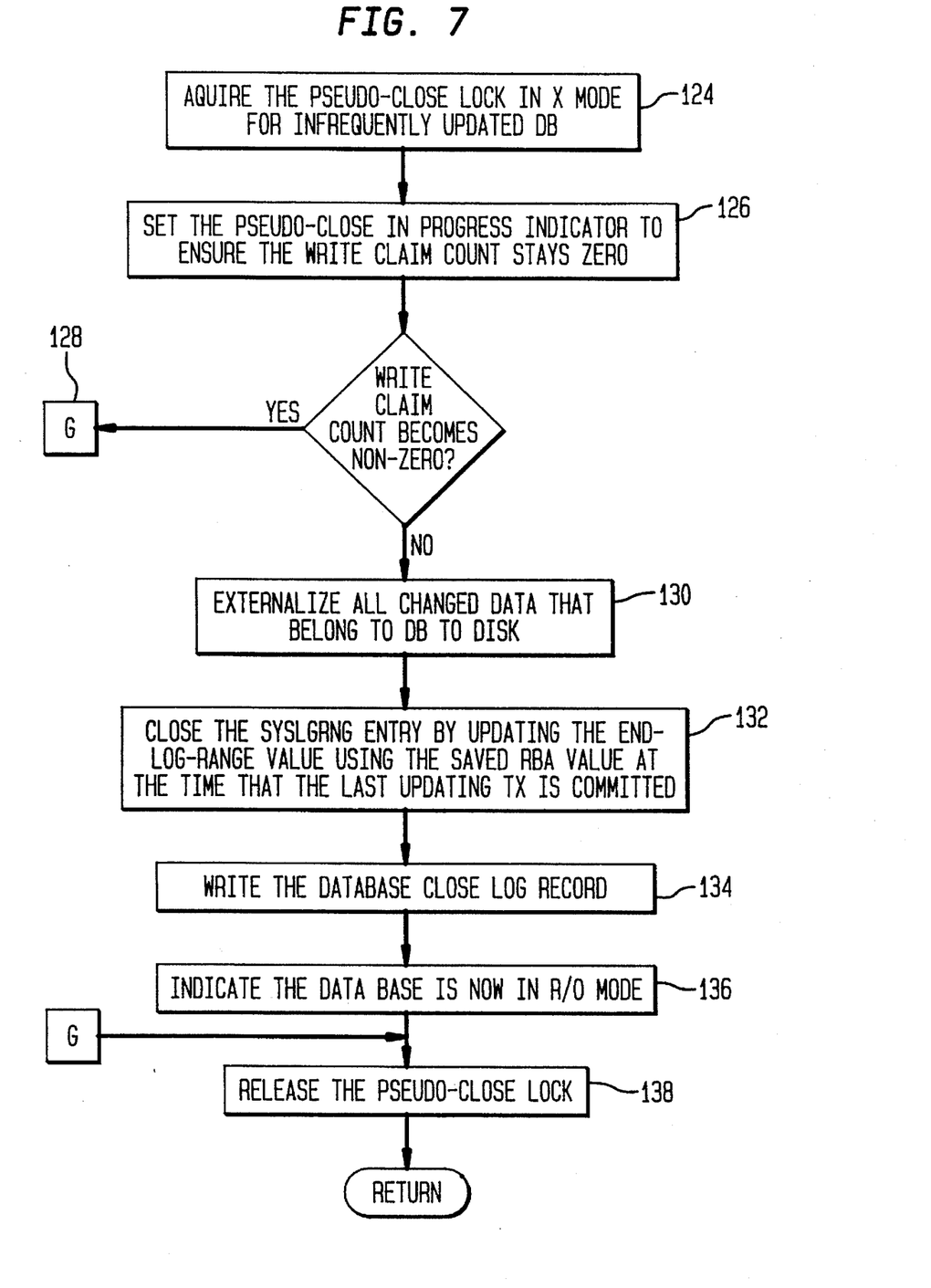
FIG. 7 is a flow chart of a process for designating a database as pseudo close.

The preferred embodiment of the process for updating a database and designating the database as pseudo open and pseudo close is shown in FIGS. 5–7.

Referring to FIG. 5, a preferred embodiment is shown for the process of registering a transaction update intent to a database (i.e., making a write claim against the database before performing any updates).

After an updated database is pseudo close or before a database is opened, a pseudo open operation must be performed before the database can be updated.

If a transaction (TX) is ready to update a database page 90 that is already write claimed by the same transaction TX 92, then no processing is needed for any pseudo open operations and the transaction processing continues 93. When a pseudo close operation is not in progress and the database is not already pseudo open, the database needs to have a pseudo open operation processing performed.

When the database is already designated as pseudo open, a write-claim counter is incremented by one 94. The write-claim counter indicates whether the database is being written to (updated) by any transactions.

The write-claim counter is incremented using a compare and swap function. The CPU compare and swap (CS) instruction is used by a tightly coupled multi-processor (MP) system to serialize updates within a shared storage area (4-byte). Before the 4-byte storage area can be updated, its old contents are loaded into a general purpose register (such as R4). For MP systems, each CPU has its own set of general purpose registers (R0 to R15).

There ere three operands associated with a CS instruction: CS (R4, R5, storage-area). To use CS, a number of tasks are performed. First, the 4-byte storage area content is loaded into R4 and a new storage area content is placed in R5. Before placing the new content into the storage area, CS compares R4 and the current content in the storage area. If they are still the same, then the new content in R5 is stored in the storage area. Otherwise, CS will not be successful and will return feedback to the CS invoker (i.e., the storage area was updated by another CPU).

The CS is used to ensure that the write-claim count stays zero while setting the pseudo close in progress indicator. If CS is unsuccessful (i.e., one or more transactions made write claims after the database is chosen as a candidate for pseudo close), then the pseudo close process is not implemented because the database is no longer in R/O access mode. Once the pseudo close indicator is set, all subsequent write claims will be queued behind the pseudo close lock which is acquired before setting the pseudo close in progress indicator.

The compare and swap function fails if there are write claims issued by other concurrent transactions or the pseudo close is in progress. The indicator of whether pseudo open is in progress is used to serialize pseudo open or wait until pseudo close is done. While waiting for the pseudo close lock, it is possible that the pseudo open operation was done by another updating transaction.

Without latching the storage area, it is possible to have different CPUs (different DBMS transactions) loading the same storage content into their own registers. Therefore, latches are used for the storage area. To ensure that no updates are getting lost because multiple CPUs are performing updates against the same storage area and to provide an atomic way of setting a status in the storage area, the CS instruction is used to provide serialization.

that the transaction has a write claim on the database 106. Once a write claim is made, it is required to declaim at transaction commit.

The pseudocode for implementing the flow chart of FIG. 5 (registering update intent to a database before making any updates to a database by a transaction) is shown in Table 1.

TABLE 1

| | | |
|---|---|---|
| 101 | IF the database is not yet write claimed by this transaction THEN | |
| 102 | DO | /= Yes, write-claim is required =/ |
| 103 | IF pseudo close is not in progress and pseudo open was already done for this database THEN | |
| 104 | DO | /= Yes =/ |
| 105 | Use the CPU compare and swap instruction to increment the write-claim counter and ensure that the pseudo close is still not in progress | |
| 106 | IF the compare and swap is unsuccessful THEN | |
| 107 | GO TO 103 | |
| 108 | END | |
| 109 | ELSE | /= pseudo close is in progress or =/ /= pseudo open is not yet done (i.e., =/ /= database is still in R/O access =/ /= mode). =/ |
| 110 | DO | |
| 111 | Acquire the pseudo close lock in exclusive mode | |
| 112 | IF pseudo open was already done by another transaction THEN | |
| 113 | GO TO 117/= release the pseudo close lock =/ /= and skip pseudo open processing. =/ | |
| 114 | Write a database open log record to indicate that the database is in update mode (for DBMS system restart use) | |
| 115 | Create a new SYSLGRNG entry and set the begin log range value to the RBA value of the open database log record and the end log range value to zero | |
| 116 | Indicate pseudo open is done for this database | |
| 117 | Release the pseudo close lock | |
| 118 | END | |
| 119 | Indicate write-claim is completed by this transaction | |
| 120 | END | |
| 121 | ELSE. | /= Write-claim was already done by =/ /= this transaction =/ |

The process for designating a database as pseudo open involves the performance of a number steps, the first of which is to acquire a pseudo close lock for the database in exclusive mode to serialize concurrent updaters as well as to serialize the pseudo close process 96. Next, a database open log record is written to indicate that the database is in update mode (for DBMS system restart use) 98. The database open log record contains descriptor information for DBMS to open the database during system restart. It also contains the log scan starting point for this database to redo write pending activities.

A new open-ended SYSLGRNG entry is created with the begin log range= RBA value of the database open log record and end log range=0 100; The SYSLGRNG entry is used to limit areas in the DBMS logs that need to be scanned and processed during a database recovery operation. A zero end log range value indicates that the ending value for this log range is unknown.

Next, a pseudo open indicator is set to designate the database as now being in R/W mode 102. Once a database is in R/W mode, the DBMS is required to write the database checkpoint log records at each DBMS system checkpoint for system restart use.

Finally, the pseudo close lock is released 104 and the transaction processing continues 93. Also, an indicator is set Referring to FIG. 6, a preferred implementation is shown of a method for performing the declaim function at transaction commit.

During the commit processing of a transaction 110, a declaim function is performed for each database write claimed by the transaction 112.

The declaim function decrements the write-claim counter for the database 114. If the write-claim counter for the database becomes zero (no uncommitted transactions updated by the database) 115, the RBA of the current end of the log is saved for pseudo-close use 116 (if it is later determined that the database can be pseudo close at this log RBA point). The compare and swap instruction is used to serialize concurrent write claims against this database.

Prior to resuming commit processing 118, the write claim on the database is removed for this transaction 120.

Pseudocode to perform the declaim function at transaction commit is shown in Table 2.

TABLE 2

| | |
|---|---|
| 201 | IF write-claim was made by this transaction THEN |
| 202 | DO   /= Yes. Need to perform the declaim function =/ |
| 203 | Use the CPU compare and swap instruction to decrement the write-claim counter by one |

TABLE 2-continued

```
204      IF compare and swap unsuccessful THEN
205         GO TO 203      /= interference, retry it again =/
206      ELSE.
207         If no more updating transaction on this database THEN
                      /= write-claim counter becomes zero      =/
208            Save the current end of log RBA value for
                  pseudo close use
209         ELSE.
210            Indicate the database is no longer write claimed by
                  this transaction
211      END
212   ELSE.
```

Referring to FIG. 7, a preferred embodiment is shown of a method for performing the pseudo close operation against an infrequently updated database. The infrequently updated database is detected when its update activities are ceased for a period of time or checkpoints.

When a database is selected for pseudo close, the DBMS performs a number of tasks. The DBMS first acquires a pseudo close lock for the database in exclusive mode 124 to prevent new transactions from updating the database while the pseudo close operation is in progress. Once a database is selected for pseudo close, the DBMS is required to ensure that the entire pseudo close process is completed before allowing new transactions to update the database again (i.e., need to serialize the pseudo close and pseudo open processes). The DBMS uses a CPU compare and swap instruction to set the pseudo close in progress indicator while the write-claim counter to stay at zero 126. If unsuccessful, the pseudo close process is ended and the pseudo close lock is released without designating the database as pseudo close 128.

Next, all changed data that belongs to this database is externalized (written to DASD) 130. In the preferred embodiment, this invention is applied to DBMSs that support a policy where updates are not required to be written back to disks at transaction commit (a not-force-at-commit policy). Therefore, it is possible that some updated data for a database are not being written back to disks (at this point, all updates must already be committed because there is no outstanding write claim against this database). Since a database close log record will be written to indicate no recovery processing operations (REDO operations) need to be performed against this database at system restart, it is necessary to guarantee that all changed data for this database are written back to DASD before the database close log record is written.

Next, the SYSLGRNG entry is closed by updating the end log range value 132 (i.e., use the log RBA value at the time that the last updating transaction is committed that was saved (see 116 in FIG. 6).

A database close log record is written to indicate that the database is no longer in update mode 134 (for DBMS system restart use). Also, the database is indicated to be in R/O mode 136 (i.e., database checkpoint records will no longer be written for this database).

After the processing is complete, the pseudo close lock is released 138.

The pseudo close lock is used to prevent new update transactions from updating the database while the pseudo close operation is in progress. This could only happen when the database becomes updated again (i.e., write-claim counter becomes non-zero). Once the pseudo close processing is completed, the pseudo close lock is released because the database is now ready to be designated as pseudo open for a subsequent update operation. It is possible that other write claims are waiting behind the pseudo close lock while pseudo close is in progress.

The database open/close/checkpoint log records are used during DBMS system restart (restart after DBMS abends). They are used to identify which databases are in update pending state (i.e., need to reapply DBMS logs to REDO the updates). The database open log record is written before the database is updated. Each DBMS system checkpoint will also write the database checkpoint log records for databases that are in R/W access state. Once a database close log record is written, it indicates that the database is no longer in R/W mode and all changed data were already written back to disks.

The database open/checkpoint log records also contain the system restart log scan starting point for each R/W database. The log scan starting point is used to indicate that all updates prior to the log scan starting point were already being written back to disks. During restart/recovery processing of a database, only the log records that are beyond the database restart redo point (which is recorded in the database open/ checkpoint log record) need to be processed. Pseudocode to perform the pseudo close operation for an infrequently updated database is shown in Table 3. The pseudo close function includes the process of closing the SYSLGRNG entry and converting the database from R/W to R/O mode.

TABLE 3

```
301   Acquire the pseudo close lock for the chosen database
         in exclusive mode
302   Use the CPU compare and swap instruction to set
         the pseudo close in progress indicator and ensures
         that the database write-claim counter stays zero
303   IF compare and swap is unsuccessful THEN
         GO TO 310 /= Release pseudo close lock and skip =/
                   /= pseudo close                        =/
305   ELSE.
306   Write and wait for all changed data that belong to
         this database to disk
307   Close the SYSLGRNG entry by updating the end log
         range value to the log RBA value saved when the last
         updating transaction is committed
308   Write a database close log record to indicate that
         the database is no longer in R/W mode
309   Indicate the database is now in R/O mode
310   Release the pseudo close lock
```

Once a database is opened, DBMS will create a control structure to represent the open database. The database is initially marked as being in R/O state. When the database is first updated, the pseudo open function needs to be performed to switch the database from R/O state to R/W state. Once the database is pseudo close, it will be marked as in R/O mode in the internal DBMS control structure (in memory) representing the open database.

This invention has a number of benefits and advantages. One advantage is that DBMS data availability is improved because less logs are scanned during a database recovery operation. Another advantage is that logging activities are reduced in each DBMS checkpoint because those infrequently updated databases, once converted to R/O mode, will no longer be logged. At each DBMS checkpoint, the DBMS is required to log all updated databases to contain information for system restart use. By converting those infrequently updated databases to R/O mode, it allows non-DBMS utilities to take what is called "non-fuzzy" backup while the DBMS still has read-only access to the database.

Furthermore, for a DBMS that supports dynamic recognition of an environment where databases can be updated by more than one system (a multi-system data sharing environment), it allows the DBMS to detect and convert databases in an environment where each database can be updated by any other system in a shared database mode to non-shared mode or R/O sharing or in an environment that one system has R/W interest, and one or more other sharing systems have R/O interest. This minimizes system overheads to manage shared databases that are no longer in full R/W sharing mode.

While the preferred embodiment of the present invention has been illustrated in detail, it should be apparent that modifications and adaptations to that embodiment may occur to one skilled in the art without departing from the scope of the present invention as set forth in the following claims.

We claim:

1. In a computerized database system having a central processing unit (CPU), volatile memory, non-volatile memory, a plurality of data stored in at least one database, wherein a plurality of transactions access a database for reading or updating, and for each database access, a transaction record is stored at an offset location in a sequential log, a program storage device readable by a machine, tangibly embodying a program of instructions executable by the machine to perform method steps for recovering a database, said method steps comprising:

during transaction processing of a database, tracking at least one log range comprising update transaction log records, said log range having a begin value and an end value, said begin value corresponding to a log offset location of a first access of the database only by an updating transaction and said end value corresponding to a log offset location at a commit or abort only of a last updating transaction; and during recovery of the database, applying the update transaction log records in said log range to a version of the database stored in non-volatile memory.

2. The program storage device of claim 1, further comprising the method steps for tracking the log range of:

a) designating each database as a pseudo close database;

b) tracking when an updating transaction accesses a database;

c) for a pseudo close database accessed by an updating transaction, designating the pseudo close database as a pseudo open database and recording a corresponding offset location as the log range begin value;

d) for a pseudo open database not accessed by an updating transaction for a predetermined period, designating the pseudo open database as a pseudo close database and recording a corresponding offset location as the log range end value; and e) repeating steps (b) through (d) a plurality of times.

3. The program storage device of claim 2 wherein the predetermined period is based on time.

4. The program storage device of claim 2 wherein the predetermined period is based on the number of records in the log.

5. The program storage device of claim 2 further comprising the steps for tracking when an updating transaction accesses a pseudo open database of:

maintaining a counter of uncommitted transactions updating a database;

incrementing the counter when an updating transaction accesses the database; and decrementing the counter when the updating transaction is committed or aborted, wherein when the counter has a value of zero, there are no updating transactions accessing the database.

6. In a computerized database system having a central processing unit (CPU), volatile memory, non-volatile memory, a plurality of data stored in a plurality of databases, wherein a plurality of transactions access a database for reading or updating, wherein for each database access, a transaction record is stored at a offset location in a sequential log, a program storage device readable by a machine, tangibly embodying a program of instructions executable by the machine to perform method steps for recovering a database, said method steps comprising:

during transaction processing of a database:

a) designating each database as a pseudo close database;

b) tracking when an updating transaction accesses a database;

c) for a pseudo close database accessed by an updating transaction, designating the pseudo close database as a pseudo open database and recording a corresponding offset location of the sequential log as a log range begin value;

d) maintaining a counter of uncommitted transactions updating a pseudo open database;

e) incrementing the counter when an updating transaction accesses the pseudo open database;

f) decrementing the counter when the updating transaction is committed or aborted, wherein when the counter has a value of zero, there are no updating transactions accessing the database;

g) for a pseudo open database not accessed by an updating transaction for a predetermined period, designating the pseudo open database as a pseudo close database and recording a corresponding offset location of the sequential log as a log range end value; and h) repeating steps (d) through (g) a plurality of times;

during recovery of the database:

applying update transaction log records between each log range begin value and log range end value to a version of the database stored in non-volatile memory.

7. A computer program product for use in a database management system, said computer program product comprising:

a computer usable medium having computer readable program code means embodied in said medium for recovering a database wherein a plurality of transactions access the database for reading or updating, and for each database access, a transaction record is stored at an offset location in a sequential log, said computer readable program code means comprising:

computer readable first program code means for designating each database as a pseudo close database;

computer readable program code means for tracking when an updating transaction accesses a database;

computer readable second program code means for designating a pseudo close database accessed by an updating transaction as a pseudo open database;

computer readable first program code means for recording an open log location when only an updating transaction first accesses a pseudo close database as the log range begin value;

computer readable third program code means for designating a pseudo open database not accessed by an updating transaction for a predetermined period as a pseudo close database;

computer readable second program code means for recording a close log location when only a last updating transaction commits or aborts as the log range end value; and computer readable program code means for applying the update transaction log records in between said log range begin value and said log range end value to a version of the database stored in non-volatile memory.

8. The computer program product of claim 7 further comprising:

computer readable program code means for maintaining a counter of uncommitted transactions updating a database;

computer readable program code means for incrementing the counter when an updating transaction accesses the database; and computer readable program code means for decrementing the counter when an updating transaction has been committed or aborted, wherein when the counter has a value of zero, there are no updating transactions accessing the database.

* * * * *